UNITED STATES PATENT OFFICE.

EDGARD CISELET AND CAMILLE DEGUIDE, OF BRUSSELS, BELGIUM.

PURIFICATION OF DISTILLATION-GASES OF COAL.

1,349,750.   Specification of Letters Patent.   Patented Aug. 17, 1920.

No Drawing.   Application filed July 6, 1915.   Serial No. 39,382.

*To all whom it may concern:*

Be it known that we, EDGARD CISELET and CAMILLE DEGUIDE, both subjects of the King of the Belgians, residing at 189 Avenue Brugmann, Brussels, Belgium, and 100 Avenue Lepoutre, Brussels, Belgium, respectively, have invented certain new and useful Improvements in the Purification of Distillation-Gases of Coal, of which the following is a specification.

This invention relates to a process for the purification of distillation gases of coal, and its object is to provide for the extraction and recuperation, with little expense and in a very efficacious manner, of the products of acid character such as compounds of sulfur and cyanogen.

In order to completely free the distillation gases of coal of their acid products, that is to say, principally of sulfureted hydrogen, hydrocyanic acid and carbonic anhydrid, it has already been proposed to treat them with a caustic solution of ammonia. This process, which is very efficacious, is onerous, for the ammonia is a product relatively costly and the impurities of the gases, especially carbonic anhydrid, by absorbing considerable quantities thereof make it practically impossible to carry out the process on a commercial scale. It is true that a part of the ammonia may be regenerated by distillation, but this operation is also expensive and complicates installations and manipulations.

It has therefore been found necessary to replace the ammonia with a more economical product and among others with lime. However, lime in suspension in a liquid does not react with the acid products of the distillation gases of coal to a sufficient extent to produce an efficacious purification of these and experiments made in this direction have given results but little satisfactory.

These difficulties are overcome by the process set forth in the appended claims in which the purification of the gases is made with the aid of a limited quantity of ammonia which is continually and automatically regenerated in the course of the operation. To this end, according to the invention, distillation gases of coal are treated with a liquid containing caustic ammonia in solution and lime in suspension. The ammonia reacts with the gases, the acid products of which it transforms respectively into sulfid, cyanid and carbonate of ammonia, but in presence of lime these ammoniacal salts give rise to a double decomposition therewith and pass to the state of salts of calcium, while the caustic ammonia is regenerated and can continue immediately its purifying action. The ammonia, therefore, plays simply the rôle of vehicle between the gases from which it takes their acid products and the lime to which it yields them immediately after and which retains them definitely. It is therefore seen that as long as the provision of lime is not exhausted, a like quantity of ammonia can serve continually for the purification of an uninterrupted current of gas.

Among the calcium salts so obtained, the carbonate alone is insoluble. It is eliminated by filtration. The residual solution containing sulfid of calcium, cyanid of calcium and ammonia can then be treated directly for the separation of these products or added to with lime and again submitted to the action of gases in order to increase its richness in sulfid and cyanid.

The ammonia is then separated by the usual means. In order finally to separate the sulfur from the cyanogen, the cyanid of calcium is transformed first into ferrocyanid of calcium by the aid of iron sulfid which may be added directly to the solution, or formed within the same by the addition of hydroxid or any suitable salt of iron. The solution is then treated with a current of carbonic anhydrid which leaves the ferrocyanid unchanged, while it puts the sulfur of the sulfid of calcium into the form of sulfureted hydrogen which is collected.

The process may be carried out as follows:

The gases coming from retorts for the distillation of coal are first freed of their tar in the usual manner. Then the acid products are extracted, preferably before the removal of their ammonia. For this purpose they are made to pass through suitable apparatus, such as atomizers, in which they are put in contact with a liquid containing caustic ammonia in solution and calcium hydrate in suspension. This liquid, which can be prepared very simply by mixing a milk of lime with a solution of caustic ammonia, or with the ammoniacal waters of the gases themselves, reacts with the gases in two phases.

The first phase is the absorption of the acid products by the ammonia:

$$H_2S + 2NH_3 = (NH_4)_2S$$
$$HCN + NH_3 = NH_4CN$$
$$CO_2 + 2NH_3 + H_2O = (NH_4)_2CO_3$$

The second phase is a double decomposition between the ammoniacal salts and the lime:

$$(NH_4)_2S + Ca(OH)_2 = 2NH_3 + CaS + 2H_2O$$
$$(NH_4)2CO_3 + Ca(OH)_2 = CaCO_3 + 2NH_3 + 2H_2O$$
$$2NH_4CN + Ca(OH)_2 = Ca(CN)_2 + 2NH_3 + 2H_2O$$

The ammonia does not therefore remain in the condition of salt. It is constantly regenerated to a caustic condition and can follow its purifying action as long as the quantity of lime is not exhausted.

After some time it is well to eliminate the carbonate of calcium, the precipitated mass of which increases rapidly. It is separated by filtration from the liquid which contains the sulfid and the cyanid of calcium and ammonia in solution.

If desired, the ammonia may then be removed by distillation. However, as after a single operation the liquid is not rich enough in sulfid and cyanid of calcium to admit of an economical extraction of the sulfur and cyanogen, it is preferable to add lime to it and send it back to atomizers, or other gas purifying apparatus. This series of operations is continued until the content of the liquid in sulfid and cyanid be judged sufficient, then it is submitted to distillation in such a way as to drive therefrom the ammonia, which is collected and which can serve to purify further quantities of gases.

There remains then a solution containing sulfid of calcium and cyanid of calcium which are to be separated. To this end there is added to it sulfid of iron, in quantity corresponding to the quantity of cyanogen contained in the liquid, in order to transform the cyanid into ferrocyanid of calcium. For the same purpose, there may also be added to the solution ferric hydroxid or an iron salt capable of reacting with the sulfid of calcium to form sulfid of iron, for example, as follows:

$$Fe_2(OH)_6 + 3CaS = 2FeS + S + 3Ca(OH)_2$$

The sulfid of iron is combined with the cyanid of calcium in giving ferrocyanid of calcium:

$$FeS + 3Ca(CN)_2 = CaS + Ca_2Fe(CN)_6$$

There then remains in solution sulfid of calcium and ferrocyanid of calcium.

Finally, in order to separate the sulfur from the cyanogen, carbonic anhydrid is made to mix with the liquid which reacts with the sulfid of calcium giving sulfureted hydrogen which is evolved and carbonate of calcium which precipitates.

$$CO_2 + H_2O + CaS = CaCO_3 + H_2S.$$

The remaining solution contains only ferrocyanid of calcium unaltered which is separated from the precipitated carbonate by filtration. If desired, the ferrocyanid may be precipitated by an iron salt, or collected in a state of ferrocyanid of calcium by making it crystallize.

As for the sulfureted hydrogen, it may be transformed at will, into sulfur or sulfuric acid.

The sulfur and the cyanogen are then recuperated under such forms as can be easily utilized, or put on the market. The principal reagents being inexpensive and of daily use in gas-works, and capable of being further regenerated, the process is very economical. Moreover, but very few changes are necessary in present installations, as any apparatus suitable for the treatment of gases with liquid reagents can be utilized in carrying out the invention.

In the process above described, other bases such as oxids or hydroxids of lead, copper, zinc, iron, manganese, barium, strontium, magnesium, etc., may be substituted for lime. The process of purification remains the same and the recuperation of the agent employed can be made by known methods.

Claims:

1. In a process for the purification of distillation gases of coal, treating the gases with a liquid containing ammonia in solution and a basic oxy-compound in a suspended condition.

2. In a process for the purification of distillation gases of coal, treating the gases with a liquid containing ammonia in solution and lime in a suspended condition.

3. In a process for the purification of distillation gases of coal, treating the gases with a liquid containing ammonia in solution and a basic oxy-compound in a suspended condition, and adding amounts of the said compound to the liquid in such manner that the ammonia does not remain in a combined state.

4. In a process for the purification of distillation gases of coal, treating the gases with a liquid containing ammonia in solution and lime in a suspended condition, and adding lime to the liquid in such manner that the ammonia does not remain in a combined state.

5. A process for the purification of distillation gases of coal, comprising treating the gases with a liquid containing ammonia in solution and a basic oxy-compound in a suspended condition, adding amounts of the said compound to the liquid in such manner that the ammonia does not remain in a combined state, distilling and recovering the ammonia.

6. A process for the purification of distillation gases of coal, comprising treating the gases with a liquid containing ammonia in solution and lime in a suspended condition, adding lime to the liquid in such manner that the ammonia does not remain in a combined state, distilling and recovering the ammonia.

7. A process for the purification of distillation gases of coal, consisting in treating the gases with a liquid containing ammonia in solution and a basic oxy-compound in a suspended condition to retain the sulfur and cyanogen contained in the gases, adding amounts of the said compound to the liquid in such manner that the ammonia does not remain in a combined state, treating the solution thus obtained with sulfid of iron to transfer the cyanogen into a ferrocyanid, and separating the sulfur compound from the ferrocyanid by subjecting the mixture to the action of carbonic anhydrid.

8. A process for the purification of distillation gases of coal, consisting in treating the gases with a liquid containing ammonia in solution and lime in a suspended condition to retain the sulfur and cyanogen contained in the gases, adding lime to the liquid in such manner that the ammonia does not remain in a combined state, treating the solution thus obtained with sulfid of iron to transfer the cyanogen into a ferrocyanid, and separating the sulfur compound from the ferrocyanid by subjecting the mixture to the action of carbonic anhydrid.

9. A process for the purification of distillation gases of coal consisting in treating the gases with a liquid containing ammonia in solution and lime in a suspended condition to retain the sulfur and cyanogen contained in the gases, adding lime to the liquid in such manner that the ammonia does not remain in a combined state, distilling and recovering the ammonia, treating the remaining solution with a salt of iron adapted to react therewith to form sulfid of iron which acts in turn to transfer the cyanogen into a ferrocyanid, and blowing carbonic anhydrid through the mixture to separate the sulfur compound from the ferrocyanid.

10. A process for the purification of distillation gases of coal consisting in treating the gases with a liquid containing ammonia in solution and lime in a suspended condition to retain the acid compounds, that is to say the compounds of sulfur, cyanogen and carbonic anhydrid, contained in the gases, adding lime to the liquid in such manner that the ammonia does not remain in a combined state, the acid compounds being transformed into salts of calcium, separating the precipitated carbonate of calcium by filtration, distilling and recovering the ammonia, treating the remaining solution with a salt of iron adapted to react therewith to form sulfid of iron which acts in turn to transfer the cyanogen into ferrocyanid of calcium, and blowing carbonic anhydrid through the mixture to separate the sulfur compound from the ferrocyanid.

11. A process for the purification of distillation gases of coal consisting in treating the gases with a liquid containing ammonia in solution and lime in a suspended condition to retain the acid compounds, that is to say the compounds of sulfur, cyanogen and carbonic anhydrid, contained in the gases, adding lime to the liquid in such manner that the ammonia does not remain in a combined state, the acid compounds being transformed into salts of calcium separating the precipitated carbonate of calcium by filtration, distilling and recovering the ammonia, treating the remaining solution with a salt of iron adapted to react therewith to form sulfid of iron which acts in turn to transfer the cyanogen into ferrocyanid of calcium; blowing carbonic anhydrid through the mixture to form sulfureted hydrogen which is then collected, and precipitating the ferrocyanid by a salt of iron.

12. A process for the purification of distillation gases of coal consisting in treating the gases with a liquid containing ammonia in solution and lime in a suspended condition to retain the acid compounds, that is to say the compounds of sulfur cyanogen and carbonic anhydrid, contained in the gases, adding lime to the liquid in such manner that the ammonia does not remain in a combined state, the acid compounds being transformed into sulfid of calcium, cyanid of calcium and carbonate or calcium respectively, separating the precipitated carbonate of calcium by filtration, collecting the solution containing sulfid of calcium and cyanid of calcium and subjecting the same to distillation to recover the ammonia, treating the said solution with salt of iron adapted to react therewith to form sulfid of iron which acts in turn to transfer the cyanogen into ferrocyanid of calcium, subjecting the mixture to filtration, blowing carbonic anhydrid through the remaining solution to form sulfureted hydrogen which is then collected, and precipitating the ferrocyanid by a salt of iron.

In testimony whereof we affix our signatures.

EDGARD CISELET.
CAMILLE DEGUIDE.

Witnesses:
H. T. E. KIRKPATRICK,
F. Y. ZOLAND.